(12) United States Patent
Kurozuka et al.

(10) Patent No.: US 8,698,858 B2
(45) Date of Patent: Apr. 15, 2014

(54) TRANSMISSIVE DISPLAY APPARATUS, MOBILE OBJECT AND CONTROL APPARATUS

(75) Inventors: Akira Kurozuka, Osaka (JP); Shinichi Kadowaki, Fukuoka (JP); Kakuya Yamamoto, Hyogo (JP); Kenichi Kasazumi, Osaka (JP); Keiji Sugiyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 158 days.

(21) Appl. No.: 13/486,299

(22) Filed: Jun. 1, 2012

(65) Prior Publication Data

US 2012/0242724 A1  Sep. 27, 2012

Related U.S. Application Data

(63) Continuation of application No. PCT/JP2011/004852, filed on Aug. 31, 2011.

(30) Foreign Application Priority Data

Oct. 4, 2010 (JP) ................................ 2010-224549

(51) Int. Cl.
- *G09G 5/02* (2006.01)
- *G09G 5/10* (2006.01)
- *G09G 5/00* (2006.01)
- *G02B 27/14* (2006.01)

(52) U.S. Cl.
USPC ............................... 345/697; 359/630; 345/7

(58) Field of Classification Search
USPC ......... 345/7–9, 697; 359/13, 629–634, 196.1, 359/212.1, 213.1, 214.1, 204.1, 204.2, 359/204.3, 204.4, 223.1, 871–872, 877, 881
See application file for complete search history.

(56) References Cited

U.S. PATENT DOCUMENTS

| 5,566,025 A | * | 10/1996 | Knoll et al. | 359/630 |
| 5,572,343 A | * | 11/1996 | Okamura et al. | 349/74 |
| 5,621,424 A | * | 4/1997 | Shimada et al. | 345/8 |

(Continued)

FOREIGN PATENT DOCUMENTS

| JP | 60-124532 | 7/1985 |
| JP | 2-141720 | 5/1990 |

(Continued)

OTHER PUBLICATIONS

International Search Report issued Oct. 4, 2011 in International (PCT) Application No. PCT/JP2011/004852.

*Primary Examiner* — Dwayne Bost
*Assistant Examiner* — Ivelisse Martinez Quiles
(74) *Attorney, Agent, or Firm* — Wenderoth, Lind & Ponack, L.L.P.

(57) ABSTRACT

A transmissive display apparatus includes a transparent display panel, a display unit which projects a display light toward a display area of the transparent display panel, a ratio change unit which is provided to the display area, is configured to be capable of changing a light transmittance, and is configured to be capable of changing a ratio of a light quantity of a rear face reflected light reaching a viewpoint relative to a light quantity of a front face reflected light reaching the viewpoint, and a control unit which alternately switches the ratio change unit between a first state and a second state. The ratio change unit lowers, in the first state, the ratio by reducing the light quantity of the rear face reflected light that reaches the viewpoint in comparison to the second state. The light transmittance increases in the second state in comparison to the first state.

11 Claims, 12 Drawing Sheets

(56) References Cited

U.S. PATENT DOCUMENTS

| | | | |
|---|---|---|---|
| 6,456,438 B1* | 9/2002 | Lee et al. | 359/630 |
| 6,747,612 B1* | 6/2004 | Knox | 345/8 |
| 6,864,927 B1* | 3/2005 | Cathey | 349/11 |
| 2002/0008708 A1* | 1/2002 | Weiss et al. | 345/597 |
| 2005/0068629 A1* | 3/2005 | Fernando et al. | 359/609 |
| 2008/0048932 A1* | 2/2008 | Yanagisawa | 345/9 |
| 2008/0218434 A1* | 9/2008 | Kelly et al. | 345/8 |
| 2009/0034087 A1* | 2/2009 | Hung et al. | 359/630 |
| 2009/0167966 A1* | 7/2009 | Nam et al. | 349/5 |
| 2010/0066925 A1* | 3/2010 | Nagahara et al. | 349/11 |
| 2012/0008708 A1* | 1/2012 | Kim et al. | 375/295 |
| 2012/0050140 A1* | 3/2012 | Border et al. | 345/8 |
| 2012/0050141 A1* | 3/2012 | Border et al. | 345/8 |
| 2012/0050142 A1* | 3/2012 | Border et al. | 345/8 |

FOREIGN PATENT DOCUMENTS

| | | |
|---|---|---|
| JP | 3-48809 | 3/1991 |
| JP | 2002-116711 | 4/2002 |
| JP | 2008-209724 | 9/2008 |

* cited by examiner

DISPLAY PERIOD (FIRST STATE)

NON-DISPLAY PERIOD (SECOND STATE)

DISPLAY PERIOD (FIRST STATE)

NON-DISPLAY PERIOD (SECOND STATE)

DISPLAY PERIOD (FIRST STATE)

NON-DISPLAY PERIOD (SECOND STATE)

DISPLAY PERIOD (FIRST STATE)

NON-DISPLAY PERIOD (SECOND STATE)

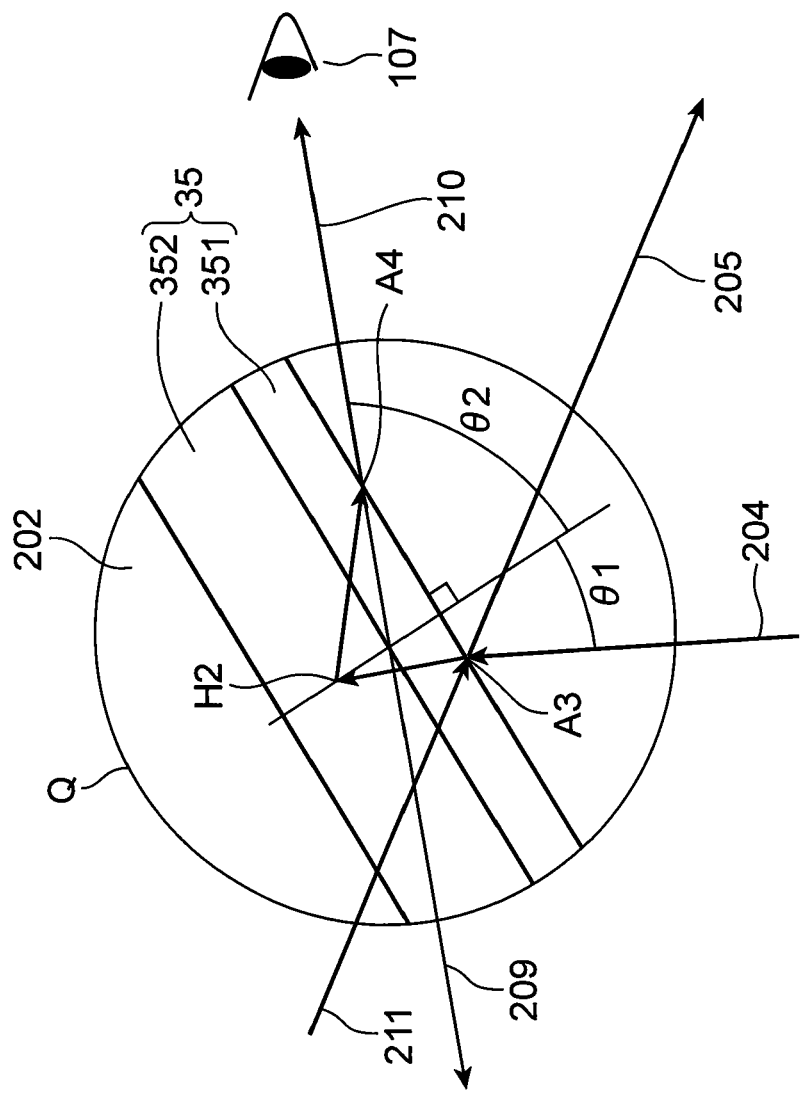

TRANSMISSIVE DISPLAY APPARATUS, MOBILE OBJECT AND CONTROL APPARATUS

This application is a Continuation of International Application No. PCT/JP2001/004852, with the International Filing Date of Aug. 31, 2011.

BACKGROUND OF THE INVENTION

1. Field of the Invention

The present invention relates to a transmissive display apparatus such as an HUD (head-up display) which projects a video picture onto a transparent display panel and causes a user to simultaneously view a virtual image thereof and a transparent background, a mobile object provided with such a transmissive display apparatus, and a control apparatus which controls an image display unit.

2. Description of the Background Art

Conventionally, a transmissive display apparatus which projects a video picture onto a transparent display panel and enables the simultaneous viewing of a virtual image thereof and a transparent background that can be viewed through the transparent display panel has been proposed. In particular, a so-called head-up display (HUD) which projects and displays a video picture on a windshield in order to indicate the speed and various warnings in the field of front vision during the driving of an automobile and the like is being developed.

When this kind of transmissive display apparatus is used, since the driver can view information (for instance, a map or speedometer) related to driving while simultaneously viewing the front external environment, the driver can drive more safely.

FIG. 10 shows an example of a conventional HUD. In this example, the simultaneous viewing of the front external environment and the display light is enabled by reflecting the display light at the windshield portion toward the driver.

In FIG. 10, 101 denotes a vehicle body that is equipped with the HUD. 102 denotes an HUD optical unit that is housed inside the dashboard, and internally includes a display unit 103 and a deflection unit 104. The display unit 103 is configured, for example, with a liquid crystal element and a light source, and displays information to be displayed to the driver's viewpoint 107. The display light that is displayed by the display unit 103 is projected toward the deflection unit 104. The deflection unit 104 is configured with a mirror or the like, and deflects the display light from the display unit 103 toward a display area 105 on a windshield 106. The display area 105 of the windshield 106 reflects the display light from the HUD optical unit 102 toward the driver's viewpoint 107, and forms a virtual image 108 of the display image. The driver can visually check information related to driving by viewing the display light that was reflected by the display area 105 of the windshield 106.

With respect to the visible light transmittance of the windshield 106, the perpendicular transmittance of the visible light is defined in order to maintain the field of view of the external environment. For example, the Japanese "Safety Standards for Road Transport Vehicles" prescribes this as 70% or higher. Accordingly, the reflectance of the display area 105 is restricted so that the perpendicular transmittance of the visible light is at least a defined value or higher. Normally, the surface reflection of glass changes depending on the incidence angle or deflecting direction. Although it is approximately 4% with vertical incidence, when the inclination of the windshield 106 often used in passenger cars is roughly 30°, in order to project the display light to the position of the viewpoint 107, the incidence will be 60 to 70° and the reflectance will be roughly 10 to 12%.

A double image is generated in this kind of conventional HUD that reflects the display light with the windshield 106.

FIG. 11 is a diagram showing the configuration of the windshield 106. With the windshield 106, normally, an inner glass 202 and an outer glass 203 are bonded via an intermediate film 201. An incident light 204 that is emitted from a certain pixel point P of the display unit 103 and enters the windshield 106 is reflected at a point A11 of the front face of the inner glass 202, becomes a front face reflected light 205, and thereby generates a display image point 207. Moreover, the incident light 204 is reflected at a point B11 of the rear face of the outer glass 203, becomes a rear face reflected light 206, and generates a ghost image point 208.

Accordingly, since there are two light paths that reach the viewpoint 107, the video picture that is projected from the display unit 103 will not be a clear video picture as shown in FIG. 12A, and will be viewed as a double image that overlaps vertically as shown in FIG. 12B.

Several methods have been proposed for reducing this kind of double image.

For example, there is a method of providing an optical interference film on the front face of the windshield (Japanese Patent Application Publication No. S60-124532). By using a filter which reflects light having a wavelength of a specific range at a high reflectance and transmits light of other wavelengths at a high transmittance, the light is adjusted to the wavelength spectrum of the display light that is emitted from the display unit, and it is thereby possible to increase the reflectance of the display light while ensuring a high transmittance. If the reflectance of the display light is high, the quantity of light that reaches the viewpoint as the rear face reflected light will decrease by that much, and the double image can thereby be reduced.

Moreover, there is a method of converting a display light into an S-polarized light and causing it to enter the windshield at a Brewster's angle (Japanese Patent Application Publication No. H2-141720). As a result of using the nature of the Brewster's angle in which the reflectance of a P-polarized light becomes zero and the reflected light completely becomes an S-polarized light, the transmitted S-polarized light is rotated to the P-polarized light with a wave plate or the like provided inside the windshield, and the rear face reflected light becomes the P-polarized light so as to eliminate any reflection and prevent a double image. The Brewster's angle is an angle that is determined by the refractive index, and is approximately 56° with glass having a refractive index of 1.5.

Moreover, there is also a method of providing a hologram within the windshield, and diffracting the display light transmitted through the front face so as to prevent the rear face reflected light from reaching the viewpoint (Japanese Patent Publication No. 2751436). If the diffraction efficiency of the hologram is designed to be approximately 100% and a sufficiently large diffraction angle can be attained, a double image can be effectively prevented.

SUMMARY OF THE INVENTION

However, the foregoing methods entailed the following problems.

With the method of Japanese Patent Application Publication No. S60-124532, since the reflected wavelength width of the optical interference film needs to be extremely narrow in order to ensure a high transmittance, the angle dependency of the reflective film will increase, and it is difficult to display the overall screen brightly. For example, if the interference film is designed to match the incidence angle at the center of the screen, the reflectance will decrease with incidence angle at the upper and lower parts of the screen, and the screen becomes dark. Moreover, in an area where the reflectance is low, the transmitted light becomes reflected by the rear face as expected, and thereby causes a double image.

With the method of Japanese Patent Application Publication No. H2-141720, the angle of installing the windshield becomes restricted in order to match the incidence angle to the windshield with the Brewster's angle in relation to the viewpoint position, and there is a problem in that this method is not compatible with car models of various designs.

With the method of Japanese Patent Publication No. 2751436, the diffraction efficiency of the hologram needs to be approximately 100% in order to diffract the light transmitted through the front face of the windshield so as to prevent it from reaching the viewpoint direction, and thereby prevent the generation of a double image. Light that is not diffracted by the hologram will be transmitted as is, and cause a double image. As the diffraction efficiency is increased, the wavelength dependency and angle dependency of the hologram will increase, and uniform display becomes difficult. In other words, similar to the case of using an optical interference film, when a hologram having a high diffraction efficiency relative to the incidence angle at the center of the screen is used, the diffraction efficiency will deteriorate at the top and bottom of the screen, and the double image prevention effect will deteriorate.

In addition, when a hologram is used, there are cases where extraneous light such as street lamps and headlights of oncoming cars is diffracted and reaches the viewpoint. In other words, in order to diffract the light transmitted through the front face of the windshield so that it does not reach the viewpoint, considered may be cases of diffracting such light upward or downward of the viewpoint, but in either case, there are cases where outside light from above reaches the viewpoint, or outside light from below reaches the viewpoint. A street lamp is an example of an outside light from above, and a headlight of an oncoming car is an example of outside light from below. Accordingly, while a driver is viewing the front external environment through the display area, if light from a direction that is different from the visual line direction reaches the viewpoint and is viewed by the driver, it becomes stray light and causes problems. This stray light can be reduced if the diffraction efficiency of the hologram is kept low, but in this case, the display light that is reflected off the rear face and reaches the viewpoint will increase, and the double image prevent effect can no longer be expected.

As described above, it was difficult to inhibit the rear face reflected light and prevent the generation of double images while maintaining a high transmittance of the windshield and causing the stray light to be unobtrusive.

One non-limiting and exemplary embodiment provides a transmissive display apparatus, a mobile object and a control apparatus capable of preventing the generation of double images while maintaining a high transmittance of the display area.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature; a transmissive display apparatus, includes: a transparent display panel which transmits an extraneous light; a display unit which projects a display light representing an image toward a display area set at a part of the transparent display panel; a ratio change unit which is provided to the display area of the transparent display panel, is configured to be capable of changing a light transmittance, and is configured to be capable of changing a ratio of a light quantity of a rear face reflected light that reaches a viewpoint of an observer relative to a light quantity of a front face reflected light that reaches the viewpoint, the rear face reflected light being the display light having transmitted through a front face of the transparent display panel and having been reflected off a rear face of the transparent display panel, and the front face reflected light being the display light having been reflected off a front face side of the display area of the transparent display panel; and a control unit which alternately switches the ratio change unit between a first state and a second state at a predetermined duty ratio, wherein the ratio change unit lowers, in the first state, the ratio by reducing the light quantity of the rear face reflected light that reaches the viewpoint in comparison to the second state, and the light transmittance of the ratio change unit increases in the second state in comparison to the first state.

These general and specific aspects may be implemented using a control apparatus and a mobile object, and any combination of control apparatuses and mobile objects.

BRIEF DESCRIPTION OF THE DRAWINGS

FIG. 9 is a partially enlarged view schematically showing the generation of stray light in Embodiment 4.

DETAILED DESCRIPTION

Embodiments are now described with reference to the drawings.

(Embodiment 1)

Figure 1:
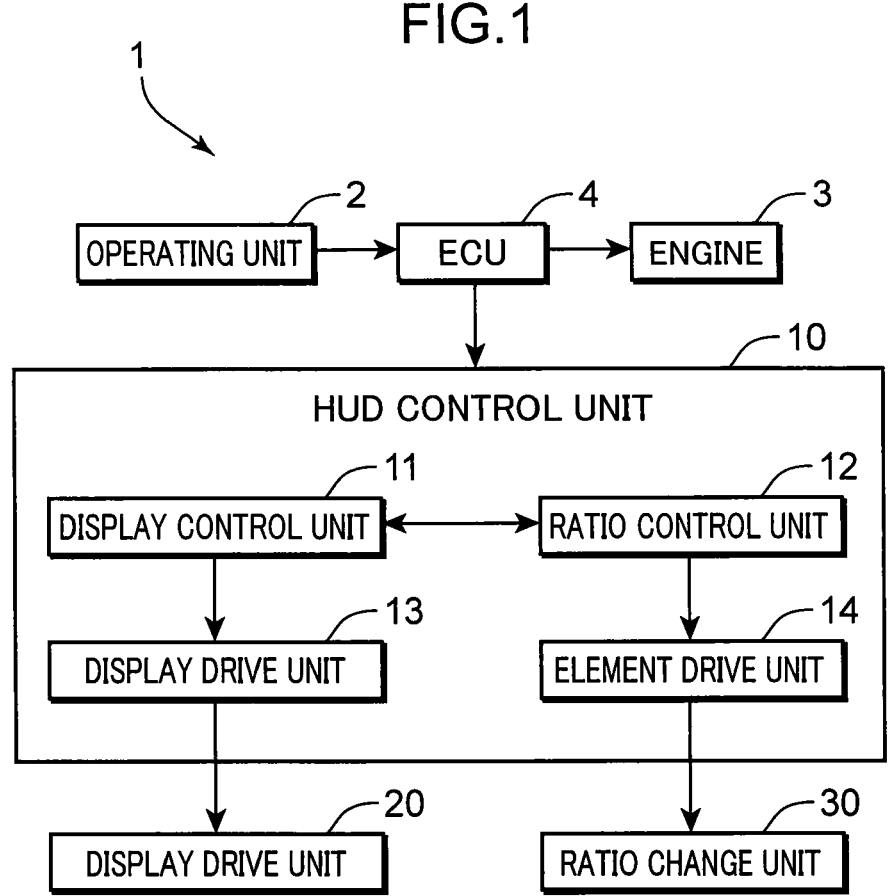
FIG. 1 is a block diagram showing an electrical configuration of a vehicle equipped with an HUD in Embodiment 1 of the present disclosure.
Figure 2:
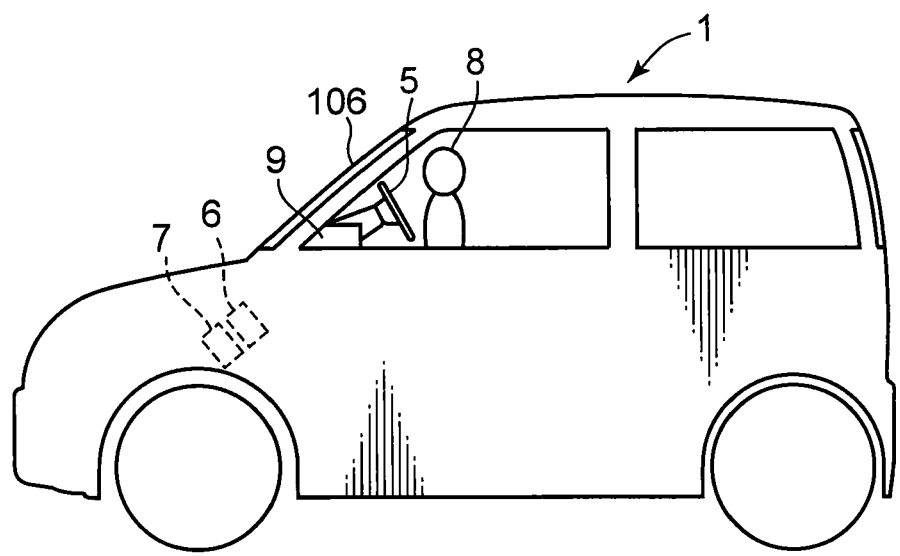
FIG. 2 is a diagram schematically showing the vehicle.
Figure 3A:
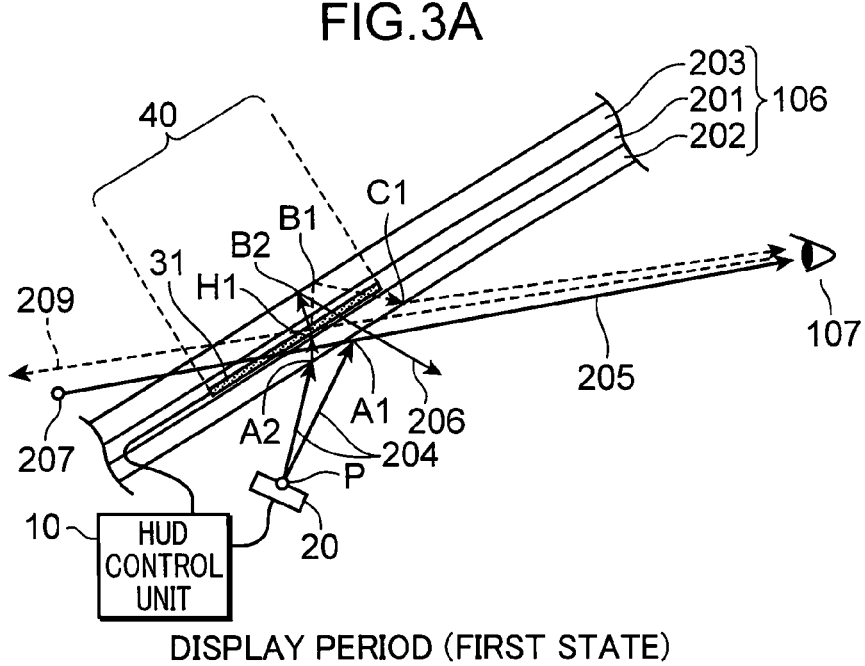
FIG. 3 is a diagram schematically showing the configuration of the HUD in Embodiment 1 of the present disclosure.
Figure 3B:
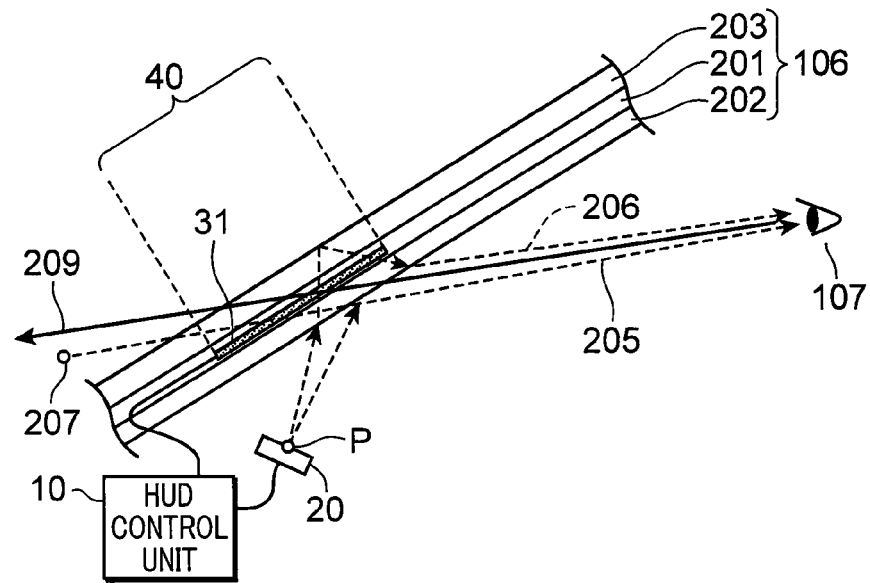
Figure 4:
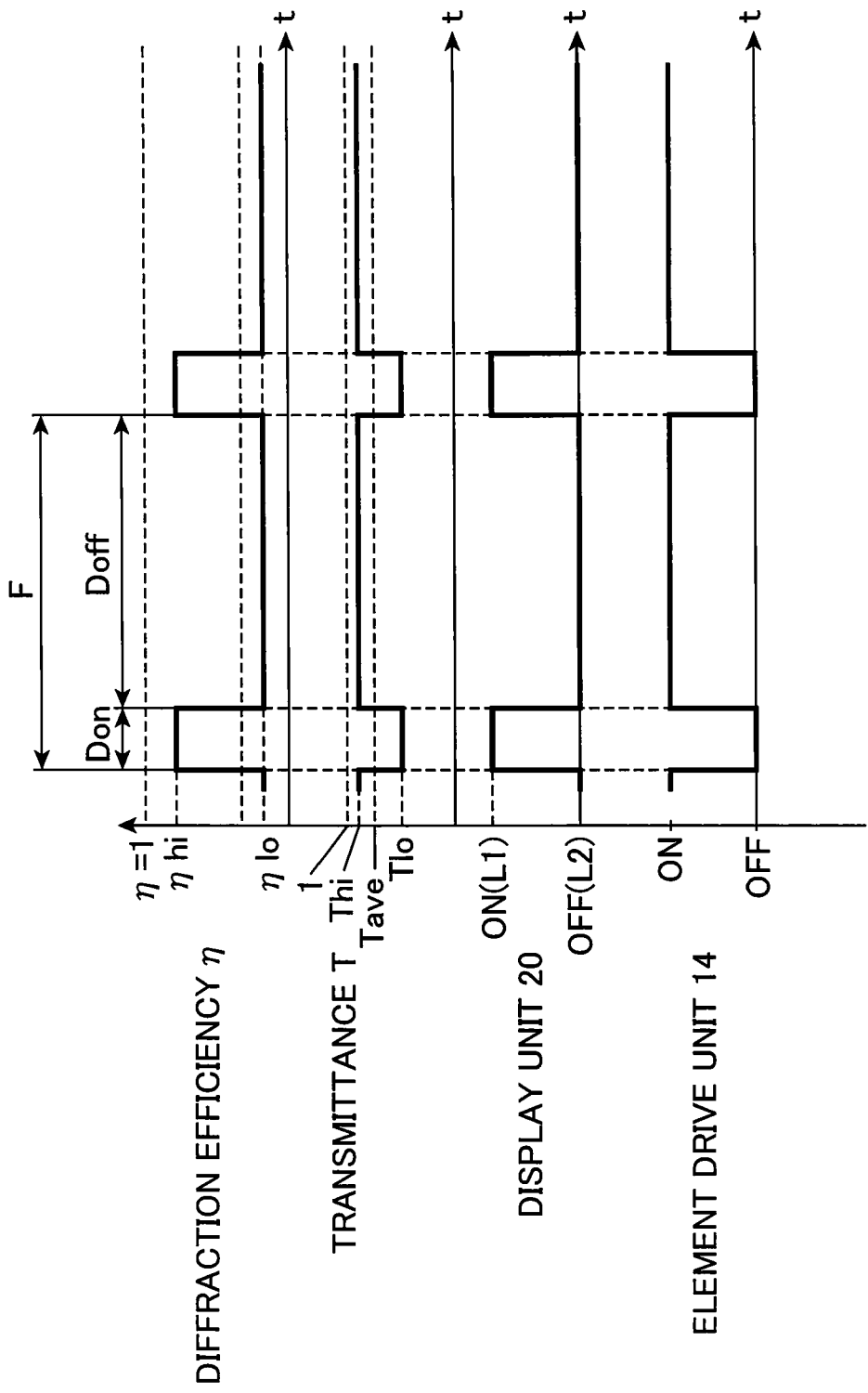
FIG. 4 is a timing chart showing an operation of Embodiment 1.

FIG. 1 is a block diagram showing an electrical configuration of a vehicle equipped with a head-up display (HUD) in Embodiment 1. FIG. 2 is a diagram schematically showing the foregoing vehicle. FIG. 3A and FIG. 3B are diagrams schematically showing the configuration of the HUD in Embodiment 1. FIG. 4 is a timing chart showing the operation of the HUD in Embodiment 1.

The vehicle 1 comprises an operating unit 2, an engine 3, an electronic control unit (ECU) 4, an HUD control unit 10, a display unit 20, and a ratio change unit 30. The HUD control unit 10 includes a display control unit 11, a ratio control unit 12, a display drive unit 13, and an element drive unit 14. The operating unit 2 includes, for instance, a steering wheel 5, a brake pedal 6, and an accelerator pedal 7. The operating unit 2 outputs, to the ECU 4, operation signals according to the operation of a driver 8. The engine 3 generates a drive force for moving the vehicle 1 according to the control signal from the ECU 4. The ECU 4 controls the overall vehicle 1 such as activating the engine 3 according to the operation signal from the operating unit 2. The ECU 4 outputs, to the HUD control unit 10, control signals representing information (speed of the vehicle 1, for instance) to be displayed to the driver's viewpoint 107.

The windshield 106 includes an inner glass 202, an outer glass 203, and an intermediate film 201 provided between the inner glass 202 and the outer glass 203 and which bonds the inner glass 202 and the outer glass 203.

The display unit 20 includes, for example, a liquid crystal element and a light source, and projects, as an incident light 204, a display light representing information (image) to be displayed to the driver's viewpoint 107 toward a display area 40 provided to a part of the windshield 106. The display drive unit 13 drives the liquid crystal element and the light source of the display unit 20. The display control unit 11 controls the display operation of the display unit 20 via the display drive unit 13 based on the control signal from the ECU 4. The ratio change unit 30 is provided to the display area 40 of the windshield 106. The ratio change unit 30 is configured to be capable of changing the ratio of the quantity of light of the rear face reflected light 206 that reaches the viewpoint 107, relative to the quantity of light of the front face reflected light 205 that reaches the viewpoint 107. The front face reflected light 205 is the incident light 204 from the display unit 20 which has been reflected by the display area 40 of the windshield 106. The rear face reflected light 206 is the incident light 204 that has transmitted through the front face of the windshield 106 and has been reflected by the rear face of the outer glass 203. The ratio change unit 30 is configured so that the transmittance of visible light increases as the foregoing ratio increases. The element drive unit 14 applies a voltage to the ratio change unit 30. The ratio control unit 12 controls the change of the foregoing ratio of the ratio change unit 30 via the element drive unit 14.

In this embodiment, the driver's viewpoint 107 corresponds to an example of an observer's viewpoint, the windshield 106 corresponds to an example of a transparent display panel, the inner glass 202 corresponds to an example of an inner transparent plate, the outer glass 203 corresponds to an example of an outer transparent plate, and the incident light 204 corresponds to an example of a display light. Moreover, the vehicle 1 corresponds to an example of a mobile object, the engine 3 corresponds to an example of a drive source, the ECU 4 corresponds to an example of a drive control unit, the driver 8 corresponds to an example of an observer, the display control unit 11 and the ratio control unit 12 correspond to an example of a control unit, and the HUD control unit 10, the display unit 20 and the ratio change unit 30 correspond to an example of a transmissive display apparatus. Moreover, the windshield 106, the display unit 20 and the ratio change unit 30 correspond to an example of an image display unit, and the HUD control unit 10 corresponds to an example of a control apparatus.

The HUD control unit 10 and the display unit 20 are housed, for example, in a dashboard 9 of the vehicle 1. As the ratio change unit 30, in Embodiment 1, as shown in FIGS. 3A, 3B, a switching diffractive element 31 provided to the intermediate film 201 is used.

Figure 10:
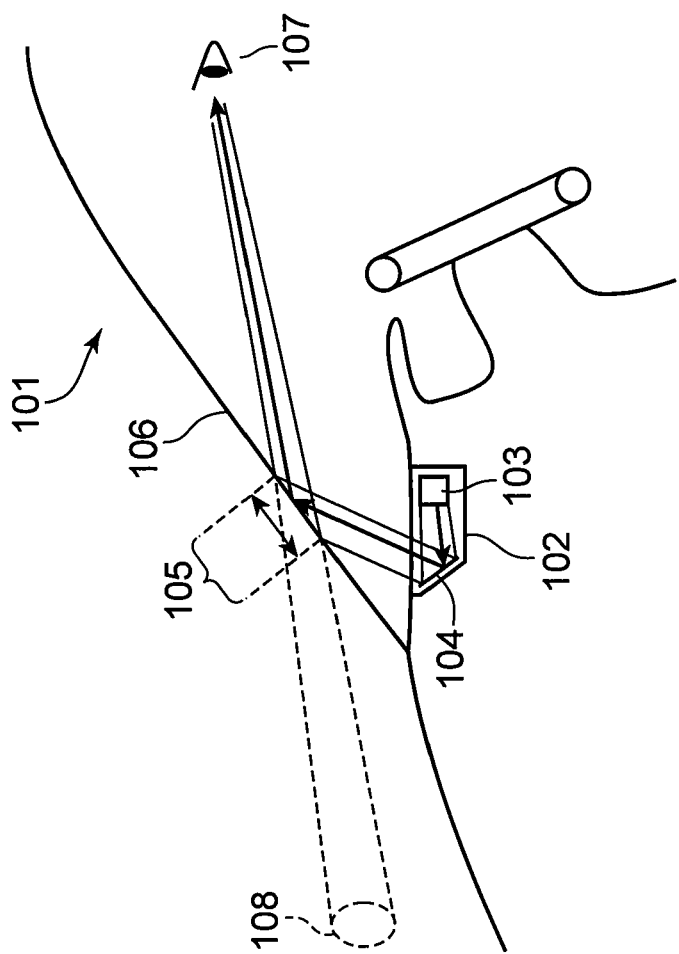
FIG. 10 is a configuration diagram of a conventional HUD.
Figure 11:
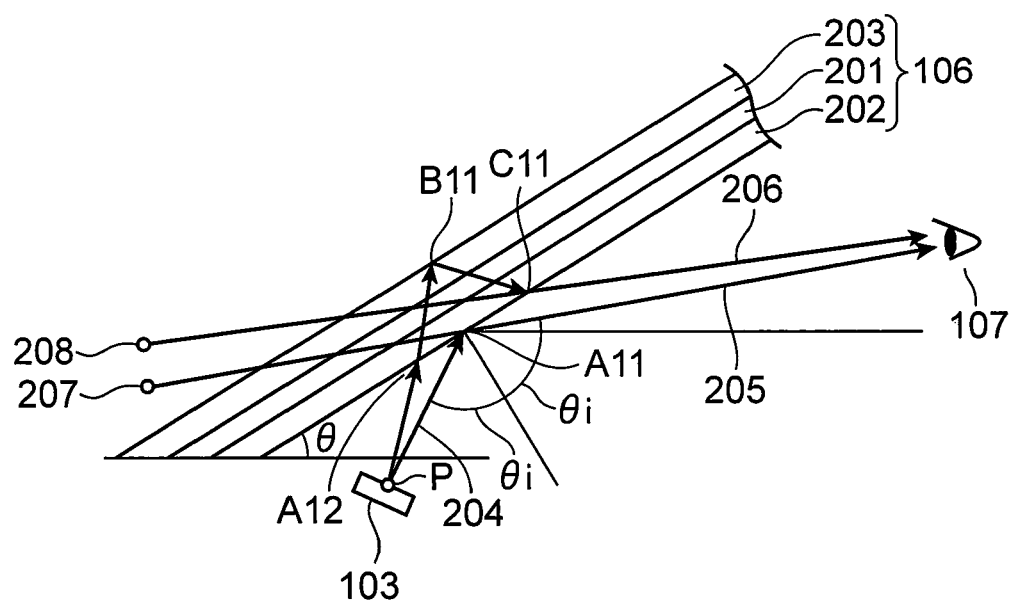
FIG. 11 is a configuration diagram of the windshield showing an example of the generation of a conventional double image.
Figure 12A:
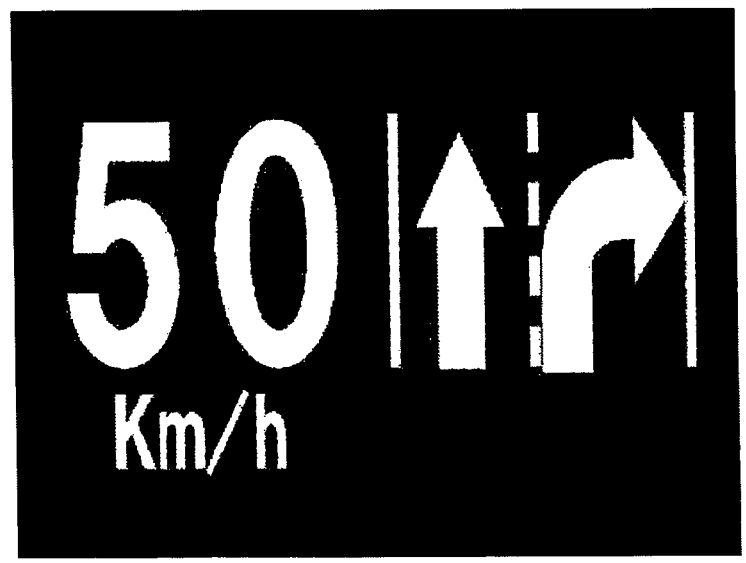
FIG. 12A is a diagram showing an example of a clear video picture.
Figure 12B:
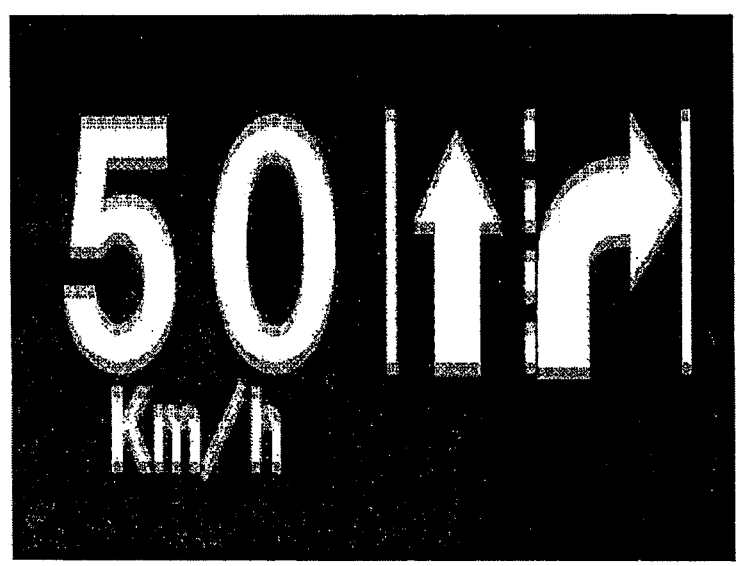
FIG. 12B is a diagram showing an example of how a double image is displayed.

In FIGS. 3A, 3B, the positional relationship of the windshield 106, the viewpoint 107 and the like is the same as the conventional configuration shown in FIG. 10, and the same number is given to common constituent elements. The switching diffractive element 31 is an element that is controlled by the ratio control unit 12 and in which its diffraction characteristics can be turned ON and OFF. The display control unit 11 and the ratio control unit 12 respectively synchronize and control the display unit 20 and the switching diffractive element 31.

As the switching diffractive element 31, for example, a switching hologram element that uses a liquid crystal material with a fast switching speed such as a ferroelectric liquid crystal may be applied. This is an element that forms a Bragg transmitting or reflective grating by exposing an interference pattern based on two intersecting coherent laser beams to a polymer-dispersed liquid crystal layer that is sandwiched by transparent electrodes. As a result of adjusting the parameters of the polymer-dispersed liquid crystal so that the refractive index of the cured polymer becomes equal to the refractive index relative to the ordinary light of the liquid crystal, the diffraction efficiency upon applying a voltage to the transparent electrode can be brought close to approximately zero. The diffraction efficiency of the peak can be brought close to 100% by adjusting the sample to an appropriate thickness. It is thereby possible to realize a switching diffractive element capable of turning ON/OFF an extremely high diffraction efficiency based on the applied voltage. The element drive unit 14 applies a voltage to the switching diffractive element 31 based on a control signal from the ratio control unit 12.

FIG. 3A shows the switching diffractive element 31 in an active state; that is, a state where voltage is not being applied. FIG. 3B shows the switching diffractive element 31 in an inactive state; that is, a state where voltage is being applied. As described later with reference to FIG. 4, the display control unit 11 controls the display unit 20 so that the display unit 20 in the active state shown in FIG. 3A displays images, and the display unit 20 in the inactive state shown in FIG. 3B does not display images.

In FIG. 3A, light emitted from a pixel point P of the display unit 20 includes a front face reflected light 205 that is reflected at a point A1 of the front face of the windshield 106 and heads toward the viewpoint 107. Relative to the front face reflected light 205, when light emitted from the pixel point P of the display unit 20 is refracted at a point A2 and reflected at a point B1 of the rear face of the windshield 106, is once again refracted at a point C1 of the front face of the windshield 106 and reaches the viewpoint 107 (dotted line in FIG. 3A), it is viewed as a double image. However, when the switching diffractive element 31 is in an active state, light that refracted at the point A2 and entered the windshield 106 is diffracted at a point H1 by the switching diffractive element 31 and heads toward a point B2. Consequently, the rear face reflected light 206 does not reach the viewpoint 107 and is not viewed as a double image.

If the diffraction efficiency of the switching diffractive element 31 is sufficiently high, a double image will hardly be viewed. Moreover, the diffraction angle must be sufficiently large so that the rear face reflected light 206 does not reach the viewpoint 107 through a slightly shifted path.

Generally, with a hologram element, the greater the diffraction angle, the higher the wavelength selectivity and angle dependency of the diffraction efficiency. Accordingly, when a hologram is formed to match the incidence angle at the center part of the screen (display area 40), the diffraction efficiency tends to deteriorate since the incidence angle will change at the upper part and the lower part of the screen. In order to prevent this, angle multiple exposure can be performed so as to cover the incidence angle relative to the entire screen.

Moreover, in order to broaden the wavelength width of the hologram so as to cover the wavelength width and the wavelength variation of the light source of the display unit 20, wavelength multiple exposure can be performed to form a hologram. In addition, a full-color display can also be realized by performing multiple exposure or lamination with the wavelength of three primary colors of RGB (red-green-blue).

However, when angle multiple exposure or wavelength multiple exposure is performed as described above, while the diffraction performance of the switching diffractive element 31 will improve, the transmittance will deteriorate as the component of the diffracted light increases.

When the transmittance deteriorates, the field of front vision becomes dark and, when the transmittance of the display area 40 in a state of being built into the windshield 106 falls below a defined value, then it can no longer be used as a windshield.

Thus, in Embodiment 1, as shown in FIG. 3B, the switching diffractive element 31 is caused to enter an inactive state so as to create a near-complete transmitting state, and, simultaneously, the display of the display unit 20 is stopped in this state. In addition, as a result of switching between active state=display period (FIG. 3A) and inactive state=non-display period (FIG. 3B) at a high speed, the display of the display unit 20 is made continuously visible from the driver's viewpoint 107. Normally, the ratio control unit 12 may switch between the respective states at 50 to 60 Hz. In this embodiment, the active state shown in FIG. 3A corresponds to an example of a first state, and the inactive state shown in FIG. 3B corresponds to an example of a second state.

FIG. 4 shows the ON/OFF (luminance) of the display unit 20 that is controlled by the display control unit 11, the ON/OFF of the application of voltage to the switching diffractive element 31 of the element drive unit 14 that is controlled by the ratio control unit 12, the diffraction efficiency η of the switching diffractive element 31, and the transmittance T.

As shown in FIG. 4, when the switching diffractive element 31 is in an active state; that is, in a state where the diffraction efficiency η is high (ηhi), the transmittance T is low (Tlo), and when the switching diffractive element 31 is in an inactive state; that is, in a state where the diffraction efficiency η is low (ηlo), the transmittance T is high (Thi). In addition, in synchronization with this switching, the ON/OFF of the display of the display unit 20 is switched. The transmittance T in this case is the transmittance of the overall display area 40 including the switching diffractive element 31 and the windshield 106.

As shown in FIG. 4, in this embodiment, the switching cycle of the ON/OFF of the display unit 20 coincides with the display frame period F (frame frequency of 60 Hz). When the duty of the display period Don is D=Don/(Don+Doff), the hourly-averaged transmittance Tave is set so that:

$$T\text{ave}=T\text{hi}\times(1-D)+T\text{lo}\times D>\text{defined value.}$$

Note that Doff represents a non-display period and F=Don+Doff.

The peak luminance L1 of the display unit 20 is set according to the duty D of the display period Don, and the hourly-averaged display luminance is caused to become equal to a case of continuous display. In other words, the luminance L1 is set so that hourly-averaged luminance Lave=L1×D becomes equal to a case of continuous display. In Embodiment 1, the display unit 20 is switched between ON/OFF, and, in FIG. 4, luminance L2=0. For example, when the duty D is ⅒, the peak luminance L1 will be ten times the luminance in the case of continuous display. Consequently, even if the transmittance of the switching diffractive element 31 is low in an active state, by switching to an inactive state having a high transmittance, the hourly-averaged transmittance Tave of the overall display area 40 will become a defined value (for example, 70%) or higher. In other words, in an active state, since the transmittance of the switching diffractive element 31 is low, the transmissive line of sight 209 (dotted line in FIG. 3A) from the viewpoint 107 is unable to view the front of the windshield 106. Meanwhile, in an inactive state, since the transmittance of the switching diffractive element 31 is high, the transmissive line of sight 209 (solid line in FIG. 3B) from the viewpoint 107 is able to view the front of the windshield 106. During an inactive period, as shown with the dotted line in FIG. 3B, the diffraction effect of the rear face reflected light 206 of the switching diffractive element 31 will be lost. However, since the display unit 20 is turned OFF by the display control unit 11 and the display light is stopped to begin with, a double image is not generated.

In other words, the key point of Embodiment 1 is to satisfy both of ensuring transmittance and shielding the rear face reflected light 206 which causes a double image, by switching, at a high speed, between a state (active state shown in FIG. 3A) in which the rear face reflected light 206 does not reach the viewpoint 107 even though the transmittance of the display area 40 will deteriorate, and a state (inactive state shown in FIG. 3B) in which the transmittance of the display area 40 is high and the display light from the display unit 20 is stopped.

In addition, there are cases where stray light is generated when the switching diffractive element 31 as in Embodiment 1 is used.

Figure 5:
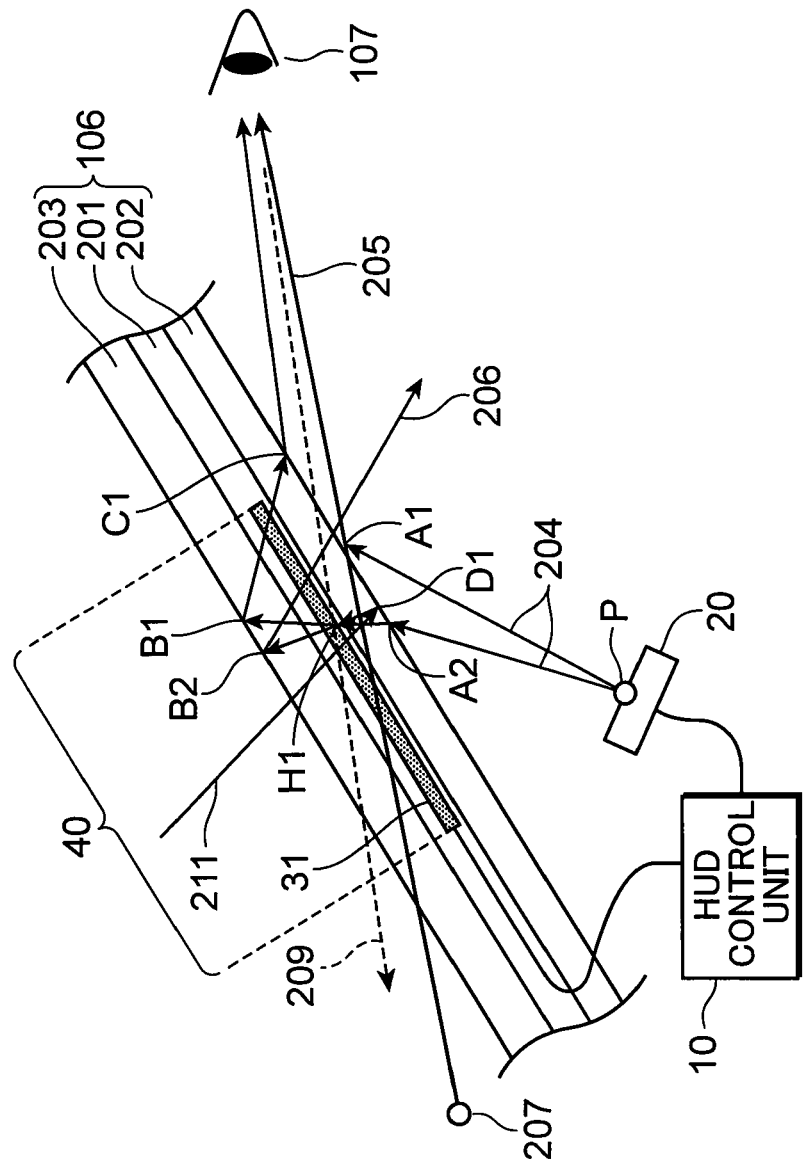
FIG. 5 is a diagram schematically showing the generation of stray light.

FIG. 5 is a diagram schematically showing the generation of stray light. FIG. 5 shows the switching diffractive element 31 in an active state as with FIG. 3A.

With the switching diffractive element 31 in an active state, the rear face reflected light 206 reaches the rear faces of the outer glass 203 of the windshield 106 through the following path; namely, pixel point P of the display unit 20→point A2 of the inner glass 202→point H1 of the switching diffractive element 31→point B2 of the rear face of the outer glass 203. In other words, the switching diffractive element 31 of Embodiment 1 is a hologram which diffracts light of point A2→point B1 to point A2→point H1→point B2. With this kind of hologram, light of point D1→point H1 which coincides with the direction of point H1 point B2 will always be diffracted to point H1→point B1.

Accordingly, when light from the outside such as the extraneous light 211 is reflected at the point D1 of the front face of the inner glass 202 of the windshield 106 and diffracted toward the direction of the point B1 at the point H1, it will become visible since it will reach the viewpoint 107.

Regardless of how the diffraction angle of the hologram is set, since extraneous light which coincides with the direction of point H1→point B2 will always exist, some kind of stray light will be visible. Since the diffraction efficiency of the switching diffractive element 31 needs to be set to approximately 100% in order to sufficiently eliminate double images, the intensity of the stray light will also be high.

Thus, as described above, when the switching diffractive element 31 is operated, in an inactive state, the extraneous light 211 is transmitted through the switching diffractive element 31 and will not reach the viewpoint 107 and, therefore, the stray light will never be viewed. Accordingly, the intensity of the visibility of stray light will deteriorate according to the duty D of the display period Don.

As described above, in Embodiment 1, the switching diffractive element 31 is provided to the intermediate film 201 within the windshield 106, the active state and the inactive state are switched at a high speed by the ratio control unit 12, and the display light from the display unit 20 is stopped by the display control unit 11 in an inactive state. Consequently, it is possible to maintain a high hourly-averaged transmittance Tave even when the transmittance is low in an active state. Moreover, most of the rear face reflected light 206, which causes the generation of double images, can be shielded while reducing the intensity of the visibility of stray light, and it is possible to realize a display that is free from double images.

(Embodiment 2)

Figure 6A:
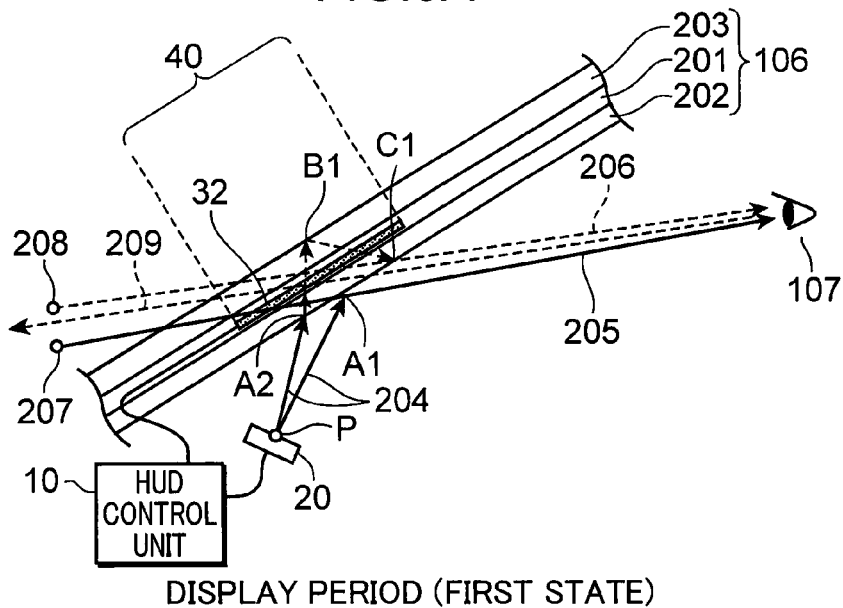
FIG. 6 is a diagram schematically showing the configuration of the HUD in Embodiment 2 of the present disclosure.
Figure 6B:
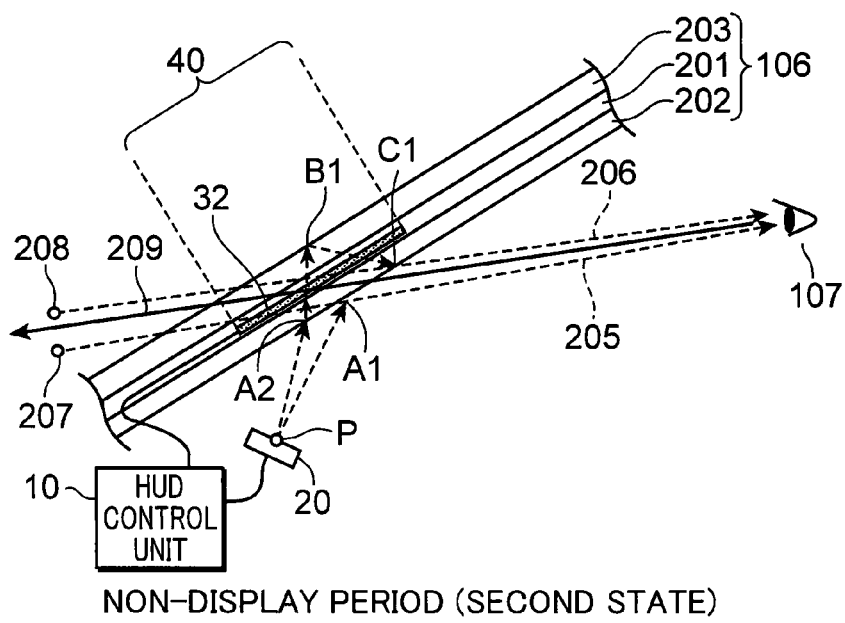

FIGS. 6A, 6B are diagrams schematically showing the configuration of the HUD in Embodiment 2. As with Embodiment 1, FIG. 6A shows the display period (first state), and FIG. 6B shows the non-display period (second state).

In Embodiment 2, as the ratio change unit 30 (FIG. 1), a switching light-shielding element 32 is used in substitute for the switching diffractive element 31. The switching light-shielding element 32 is an element in which the transmittance changes based on the application of voltage and, for example, is a multilayer body in which a composite membrane where metal particles are dispersed in the mother phase of the dielectric material is sandwiched by transparent conductive films, and is an element that is configured so that the transmittance will decrease when voltage is applied.

By using this kind of switching light-shielding element 32, in FIG. 6A, the ratio control unit 12 controls the element drive unit 14, and, in a state where the transmittance is decreased as a result of the element drive unit 14 applying voltage to the switching light-shielding element 32, the display control unit 11 controls the display drive unit 13 to cause the display unit 20 to emit the display light. Meanwhile, in FIG. 6B, in a state where the transmittance is high as a result of the ratio control unit 12 controlling the element drive unit 14 so that it does not apply voltage to the switching light-shielding element 32, the display control unit 11 stops the display light of the display unit 20. As a result of performing high-speed switching of these similar to Embodiment 1 shown in FIG. 4, the display of the display unit 20 is made continuously visible from the observer's viewpoint 107.

In FIG. 6A, light in which the display light from the display unit 20 is refracted at the point A2 of the inner glass 202 and heads toward the point B1 is additionally reflected at the point B1 of the rear face of the outer glass 203, heads toward the point C1 of the inner glass 202, and is transmitted through the switching light-shielding element 32 twice. Accordingly, when the transmittance of the switching light-shielding element 32 is 30% in the display period, the rear face reflected light 206 that reaches the viewpoint 107 is decreased to 9% of the case without the switching light-shielding element 32. Moreover, when the transmittance of the switching light-shielding element 32 is 20%, the rear face reflected light 206 that reaches the viewpoint 107 is decreased to 4% of the case without the switching light-shielding element 32.

In the state shown in FIG. 6A, the transmittance is too low for use as the windshield 106. However, the switching light-shielding element 32 is operated and, as with Embodiment 1 described with reference to FIG. 4, the ratio control unit 12 sets the transmittances Thi, Tlo and duty D so that the hourly-averaged transmittance Tave becomes a defined value (for example, 70%) or higher. Moreover, the display control unit 11 sets the display luminance (L1 of FIG. 4) of the display unit 20 in the display period so that the hourly-averaged display luminance becomes equal to a continuous display. In this embodiment, the state shown in FIG. 6A corresponds to an example of a first state and the state shown in FIG. 6B corresponds to an example of a second state.

When an element without a diffraction effect is used as in Embodiment 2, there is no problem of stray light that occurs in Embodiment 1. Accordingly, as described above, in Embodiment 2, the switching light-shielding element 32 is provided to the intermediate film 201 within the windshield 106, the ratio control unit 12 switches between the high transmittance-low transmittance states at a high speed, and the display control unit 11 stops the display light from the display unit 20 in a high transmittance state. It is thereby possible to shield the rear face reflected light 206 which causes double images while maintaining a high hourly-averaged transmittance Tave, and reduce the generation of double images.

As the switching light-shielding element 32, a light-shielding element using so-called electrochromic material may also be used, and any material in which the variation width of transmittance is sufficiently large and the switching speed is sufficiently fast can be used.

(Embodiment 3)

Figure 7A:
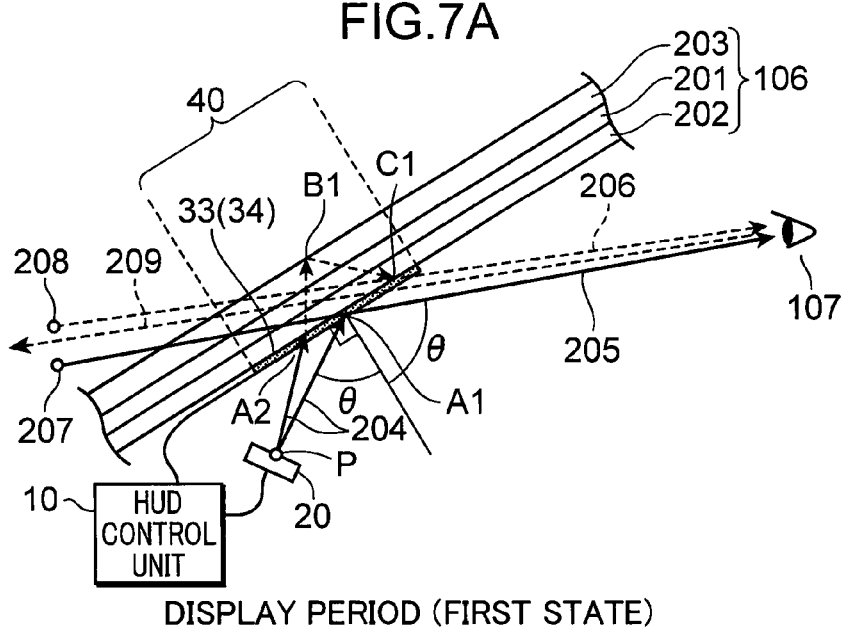
FIG. 7 is a diagram schematically showing the configuration of the HUD in Embodiment 3 of the present disclosure.
Figure 7B:
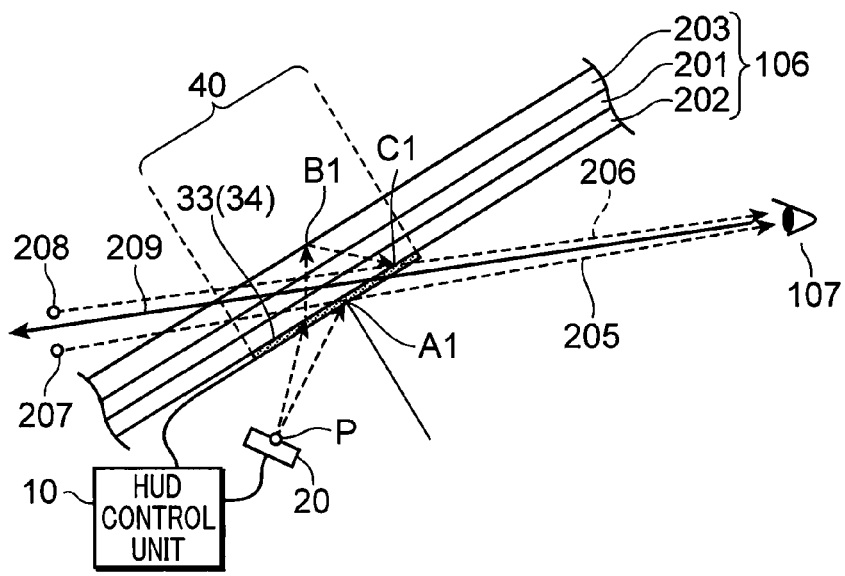

FIGS. 7A, 7B are diagrams schematically showing the configuration of the HUD in Embodiment 3. As with Embodiment 1, FIG. 7A shows the display period (first state), and FIG. 7B shows the non-display period (second state).

In Embodiment 3, as the ratio change unit 30 (FIG. 1), a switching mirror element 33 is provided to the inner face side (front face side) of the inner glass 202 and used as the display reflecting surface in substitute for providing the switching diffractive element 31 within the windshield 106 as in Embodiment 1. The switching mirror element 33 is an element in which the reflectance and transmittance simultaneously change when voltage is applied. As the switching mirror element 33, for example, an element in which the switching diffractive element used in Embodiment 1 is formed as a reflective hologram can be used.

In Embodiment 3, as the switching mirror element 33, formed is a reflective hologram which functions as a standard mirror in which the incidence angle and the reflection angle are equal (θ in FIG. 7A), reflects the incident light approximately 100% in an active state when voltage is not applied, and transmits the incident light approximately 100% in an inactive state when voltage is applied.

The switching mirror element 33 is provided to the front face of the inner glass 202 of the windshield 106. Accordingly, the polymer-dispersed liquid crystal layer with a hologram actually formed thereon is covered by a transparent electrode and a transparent protective substrate (not shown). The transparent protective substrate may be sufficiently thinner than the thickness of the windshield 106. Accordingly, since the display light that is reflected by the front face of the transparent protective substrate basically coincides with the display light that is reflected by the hologram layer, there is no problem as a double image.

As described in Embodiment 1, it is also possible to broaden the range of angle of reflection by performing angle multiple exposure, or broaden the reflected wavelength width by performing wavelength multiple exposure and thereby form the switching mirror element 33 having a reflecting surface which corresponds to the uniformity of the screen of the display unit 20 or the wavelength variation of the light source. In this case, while the transmittance will decrease since the components of the reflected light will increase when the switching mirror element 33 is in an active state, light will not be reflected or diffracted and most of the light will be transmitted when the switching mirror element 33 is in an inactive state; that is, the transmittance of the switching mirror element 33 will become a high state.

As with foregoing Embodiment 1, in Embodiment 3 also, the display light is emitted from the display unit 20, which results in a display period, when the switching mirror element 33 is in an active state (FIG. 7A), and the display light from the display unit 20 is stopped, which results in a non-display period, when the switching mirror element 33 is in an inactive state (FIG. 7B). These two states are switched at a high speed similar to Embodiment 1 described with reference to FIG. 4. It is thereby possible to cause the display of the display unit 20 to be continuously visible from the viewpoint 107, and ensure the transmittance as the windshield 106 to be a defined value or higher.

During the display period shown in FIG. 7A, the display light (incident light 204) emitted from the display unit 20 is reflected at a high reflectance by the switching mirror element 33. In other words, the incident light 204 to the points A1, A2 of the front face of the switching mirror element 33 is reflected at a high reflectance in both cases. Accordingly, in FIG. 7A, as point A2→point B1→point C1 is shown with a dotted line, since there is hardly any component that is transmitted through the rear face of the windshield 106, a double image is not generated. However, since the transmissive line of sight 209 (dotted line in FIG. 7A) is blocked by the switching mirror element 33, it is not possible to view the front of the windshield 106.

Meanwhile, during the non-display period shown in FIG. 7B, since the reflectance of the switching mirror element 33 is basically zero, the transmissive line of sight 209 (solid line in FIG. 7B) is in a state where it can view through the front of the windshield 106. Moreover, since the display unit 20 stops the display light, a double image is not generated. In this embodiment, the state shown in FIG. 7A corresponds to an example of a first state, and the state shown in FIG. 7B corresponds to an example of a second state.

In Embodiments 1 and 2 described above, the reflection of the display light from the display unit 20 was the front face reflection of the windshield 106, the reflectance itself was constant. The reflectance of glass is determined based on the refractive index and the incidence angle, and in standard cases where the inclination of the windshield 106 is approximately 30 degrees, the incidence angle was roughly 60 degrees and the reflectance was roughly 10%. In comparison, with Embodiment 3, since the reflectance of the display surface of the switching mirror element 33 changes to a high state of approximately 100% when the switching mirror element 33 is in an active state, the peak luminance (L1 shown in FIG. 4) of the display unit 20 when the duty D of the display period Don is reduced may be low.

With the switching mirror element 33 using a hologram that is formed as a standard mirror in which the incidence angle and the reflection angle are equal, the problem of stray light described in Embodiment 1 will not arise.

Moreover, with this kind of configuration, it is also possible to use a switching photochromatic mirror 34 (FIG. 7A, 7B) in substitute for the switching mirror element 33 described above. The switching photochromatic mirror 34 is a reflective dimming element made of magnesium/titanium-based alloy in which a multi-layer thin film is formed on a transparent base material for example. The switching photochromatic mirror 34 is an all solid-state reflective dimming electrochromic element formed with a transparent conductive film layer, an ion storage layer, a solid-state electrolyte layer, a catalyst layer, and a reflective dimming layer using a magnesium/ titanium-based alloy thin film. The switching photochromatic mirror 34 is configured to be capable of being electrically switched between a water-clear state and a mirror state.

(Embodiment 4)

Figure 8A:
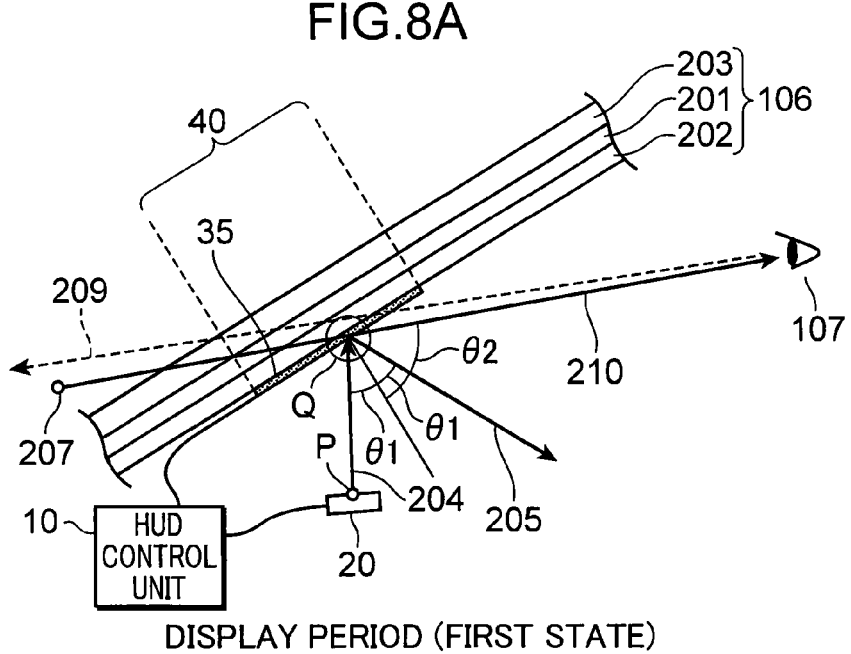
FIG. 8 is a diagram schematically showing the configuration of the HUD in Embodiment 4 of the present disclosure.
Figure 8B:
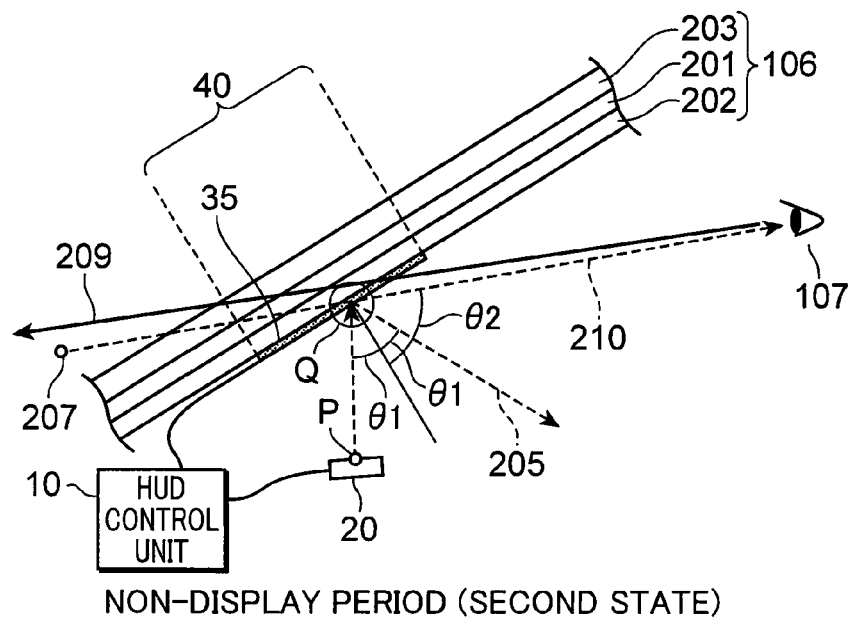

FIGS. 8A, 8B are diagrams schematically showing the configuration of the HUD in Embodiment 4. As with the foregoing embodiments, FIG. 8A shows the display period (first state), and FIG. 8B shows the non-display period (second state).

In Embodiment 4, as the ratio change unit 30 (FIG. 1), a switching mirror element 35 is used. The switching mirror element 35 is an element in which the switching diffractive element is formed as a reflective hologram as with Embodiment 3, but differs in that the reflective hologram is formed so that the incidence angle and the reflection angle are different. Light emitted from the pixel point P of the display unit 20 enters the switching mirror element 35 at an incidence angle $\theta 1$, is diffracted and reflected at an output angle $\theta 2$ by the switching mirror element 35, and the diffracted/reflected light 210 heads toward the viewpoint 107. As shown in FIG. 8A, when the hologram is formed so that $\theta 1 < \theta 2$, the light reflected at the point A3 (FIG. 9) of the front face of the switching mirror element 35; that is, the front face reflected light 205 will head lower than the viewpoint 107, and will not be viewed. Moreover, even when the display light transmitted through the switching mirror element 35 is reflected by the rear face of the windshield 106, there is no path for it to head toward the viewpoint 107. Accordingly, Embodiment 4 is configured so that, basically, a double image is not generated.

In this case also, as with Embodiments 1 and 3, it is also possible to broaden the range of angle of reflection by performing angle multiple exposure, or broaden the reflected wavelength width by performing wavelength multiple exposure and thereby form the switching mirror element 35 having a reflecting surface which corresponds to the uniformity of the screen or the wavelength variation of the light source. In such a case, the transmittance will decrease since the components of the reflected light will increase when the switching mirror element 35 is in an active state. Meanwhile, light will not be reflected or diffracted and most of the light will be transmitted when the switching mirror element 35 is in an inactive state; that is, the transmittance will become a high state. Based on the display control unit 11, the display light is emitted from the display unit 20, which results in a display period, when the switching mirror element 35 is in an active state, and the display light from the display unit 20 is stopped, which results in a non-display period, when the switching mirror element 35 is in an inactive state. This active state and this inactive state are switched at a high speed similar to Embodiment 1 described with reference to FIG. 4. It is thereby possible to cause the display of the display unit 20 to be continuously visible from the viewpoint 107, and ensure the transmittance as the windshield 106 to be a defined value or higher.

In addition, with the switching mirror element 35 using a hologram in which the incidence angle and the output angle are different as in Embodiment 4, stray light may arise as with Embodiment 1.

FIG. 9 is a partially enlarged view schematically showing the generation of stray light in Embodiment 4. FIG. 9 is an enlarged view of an area Q (circle shown in FIGS. 8A, 8B) where the incident light 204, which is the display light emitted from the pixel point P of the display unit 20, enters the switching mirror element 35 in FIGS. 8A, 8B.

The incident light 204 is refracted and enters at the point A3 of the front face of the transparent protective substrate 351 covering the switching mirror element 35, is diffracted and reflected at a point H2 in the hologram layer 352, heads from the point A4 of the front face of the transparent protective substrate 351 toward the viewpoint 107 and is viewed as the diffracted/reflected light 210.

Here, among the extraneous lights, there is an extraneous light 211 that is transmitted through the windshield 106 and the switching mirror element 35, reflected at the point A3 of the front face of the transparent protective substrate 351, and heads toward the point H2. Since this extraneous light 211 coincides with the direction that the incident light 204 enters the hologram layer 352, it is diffracted and reflected by the hologram layer 352 of the switching mirror element 35, and reaches the viewpoint 107. If there is a strong light source such as a street lamp or a headlight of an oncoming car in the direction of the extraneous light 211 that is different from the direction of the transmissive line of sight 209, there is a problem in that this will be viewed as stray light. The higher the reflectance of the switching mirror element 35 is set, the stronger the intensity of the stray light.

Thus, as described above, when the switching mirror element 35 is operated to alternately switch between an active state and an inactive state at a high speed, in the inactive state (FIG. 8B), the extraneous light 211 that is different from the direction of the transmissive line of sight 209 is transmitted through the switching mirror element 35 and will not reach the viewpoint 107 and, therefore, will not be viewed as stray light. Accordingly, the intensity of the visibility of stray light will decrease according to the duty D of the display period Don.

As described above, in Embodiment 4, the switching mirror element 35 is provided to the inner face of the windshield 106 (front face of the inner glass 202), the switching mirror element 35 is switched between an active state and an inactive state at a high speed by the ratio control unit 12, and the display light from the display unit 20 is stopped by the display control unit 11 in an inactive state. It is thereby possible to maintain a high hourly-averaged transmittance Tave even if the transmittance is low when the switching mirror element 35 is in an active state. Moreover, the intensity of the visibility of stray light can also be reduced.

Note that, with the configuration of Embodiment 4, the switching mirror element 35 can also be formed on the intermediate film 201 within the windshield 106 as with Embodiment 1. In this case, even if the inner glass 202 is thick, since the configuration is such that the directions of the front face reflected light 205 and the diffracted/reflected light 210 are different, a double image is not generated. Accordingly, as described above, similar effects can be yielded by driving the switching mirror element 35 to alternately switch between an active state and an inactive state so as to avoid the problems related to transmittance and stray light.

The embodiments described above are merely illustrative, and various modes may be adopted so long as they do not deviate from the gist of the present disclosure.

For example, in each of the foregoing embodiments, the display light of the display unit 20 is stopped when the switching diffractive element 31 or the like is in an inactive state. In other words, in FIG. 4, the luminance L2 of the display unit 20 is set L2=0. However, the present disclosure is not limited thereto. Alternatively, for example, the luminance L2 may be set so as to achieve 0<L2<L1 when the switching diffractive element 31 or the like is in an inactive state. In this case also, since the setting is L2<L1, in comparison to the case of L2=L1, it is possible to inhibit a double image from being viewed when the switching diffractive element 31 or the like is in an inactive state. More alternatively, in the present disclosure, the luminance L2 may be set so as to achieve L2=L1.

In other words, the luminance of the display unit 20 may be set to the same luminance in both an inactive state and an active state. In this case also, by alternately switching between an active state and an inactive state at a predetermined duty ratio, it is possible to inhibit a double image from being viewed to a certain degree, and view the outside of the windshield 106 to a certain degree.

In each of the foregoing embodiments, the description is made by taking an HUD for use in vehicles as an example, but each of the foregoing embodiments can also be applied to an HUD of other mobile objects such as aircrafts and ships. Moreover, each of the foregoing embodiments can also be applied to so-called head-mount displays in the form of eyeglasses or goggles. In addition, each of the foregoing embodiments can also be applied to transmissive displays comprising various types of transparent display panels such as store windows, display cases of museums, and windows of buildings.

Moreover, with each of the foregoing embodiments, the HUD control unit 10 and the display unit 20 are housed in the dashboard 9 of the vehicle 1. However, the present disclosure is not limited thereto. Alternatively, the configuration may be such that the HUD control unit 10, the display unit 20 and the ratio change unit 30 are mounted on the vehicle 1 as an option after completion. In this case, for example, the HUD control unit 10 and the display unit 20 may be disposed on the dashboard 9, and, as the ratio change unit 30, the switching mirror element 33 or the like of Embodiment 3 or 4 may be provided on the front face of the inner glass 202. Moreover, the ECU 4 may be configured in advance so that it is communicable with the HUD control unit 10 to be mounted as an option. Moreover, the HUD control unit 10 may be configured to be communicable with the ECU 4.

Note that the foregoing specific embodiments mainly include an exemplary embodiment configured as described below.

In one general aspect, a transmissive display apparatus includes: a transparent display panel which transmits an extraneous light; a display unit which projects a display light representing an image toward a display area set at a part of the transparent display panel; a ratio change unit which is provided to the display area of the transparent display panel, is configured to be capable of changing a light transmittance, and is configured to be capable of changing a ratio of a light quantity of a rear face reflected light that reaches a viewpoint of an observer relative to a light quantity of a front face reflected light that reaches the viewpoint, the rear face reflected light being the display light having transmitted through a front face of the transparent display panel and having been reflected off a rear face of the transparent display panel, and the front face reflected light being the display light having been reflected off a front face side of the display area of the transparent display panel; and a control unit which alternately switches the ratio change unit between a first state and a second state at a predetermined duty ratio, wherein the ratio change unit lowers, in the first state, the ratio by reducing the light quantity of the rear face reflected light that reaches the viewpoint in comparison to the second state, and the light transmittance of the ratio change unit increases in the second state in comparison to the first state.

According to this configuration, the transparent display panel transmits an extraneous light. The display unit projects a display light representing an image toward a display area set at a part of the transparent display panel. The ratio change unit is provided to the display area of the transparent display panel. The ratio change unit is configured to be capable of changing a ratio of a light quantity of a rear face reflected light that reaches a viewpoint of an observer relative to a light quantity of a front face reflected light that reaches the viewpoint. The rear face reflected light is the display light having transmitted through a front face of the transparent display panel and having been reflected off a rear face of the transparent display panel. The front face reflected light is the display light having been reflected off a front face side of the display area of the transparent display panel. The ratio change unit is configured to be capable of changing a light transmittance. The control unit alternately switches the ratio change unit between a first state and a second state at a predetermined duty ratio. The ratio change unit, in the first state, lowers the foregoing ratio by reducing the light quantity of the rear face reflected light that reaches the viewpoint in comparison to the second state. The light transmittance of the ratio change unit increases in the second state in comparison to the first state.

Accordingly, since the foregoing ratio decreases in comparison to the second state when the ratio change unit is in the first state, it becomes difficult for the front face reflected light and the rear face reflected light to be viewed as a double image. Meanwhile, since the light transmittance increases in comparison to the first state when the ratio change unit is in the second state, the opposite side can be viewed easily from the viewpoint through the display area of the transparent display panel that is provided with the ratio change unit. Consequently, as a result of alternately switching the ratio change unit between the first state and the second state at a predetermined duty ratio, it is possible to inhibit the front face reflected light and the rear face reflected light from being viewed as a double image, and enable the viewing of the opposite side from the viewpoint through the display area of the transparent display panel that is provided with the ratio change unit.

In the foregoing transmissive display apparatus, for example, the control unit adjusts the duty ratio to cause an hourly-averaged visible light transmittance in the display area of the transparent display panel to be a predetermined defined value or higher.

According to this configuration, the control unit adjusts the duty ratio and causes an hourly-averaged visible light transmittance in the display area of the transparent display panel to be a predetermined defined value or higher. The control unit alternately switches the ratio change unit between a first state and a second state at a predetermined duty ratio. Moreover, when the ratio change unit is in the second state, the light transmittance is high in comparison to the first state. Accordingly, as a result of the control unit adjusting the duty ratio and causing an hourly-averaged visible light transmittance in the display area of the transparent display panel to be a predetermined defined value or higher, the observer can suitably view the opposite side through the display area of the transparent display panel that is provided with the ratio change unit.

In the foregoing transmissive display apparatus, for example, the control unit controls the display unit to set a luminance of the display light projected from the display unit when the ratio change unit is in the first state as a first luminance, and sets a luminance of the display light projected from the display unit when the ratio change unit is in the second state as a second luminance that is lower than the first luminance.

According to this configuration, the control unit controls the display unit and sets a luminance of the display light projected from the display unit as a first luminance when the ratio change unit is in the first state, and to set a luminance of the display light projected from the display unit as a second luminance that is lower than the first luminance when the ratio change unit is in the second state. When the ratio change unit is in the second state, the front face reflected light and the rear face reflected light tend to be viewed as a double image since the foregoing ratio is high in comparison to the first state. However, the luminance of the display light is set as the second luminance that is lower than the first luminance, thereby it is possible to inhibit a double image from being viewed. Meanwhile, when the ratio change unit is in the first state, the double image is not viewed easily since the foregoing ratio is low in comparison to the second state. Thus, the display light can be suitably viewed since the luminance of the display light is set to the first luminance that is higher than the second luminance.

In the foregoing transmissive display apparatus, for example, the control unit sets the first luminance and the second luminance to values according to the duty ratio so that an hourly-average luminance of the display light becomes a predetermined level or higher.

According to this configuration, the control unit sets the first luminance and the second luminance to values according to the duty ratio so that an hourly-average luminance of the display light becomes a predetermined level or higher. Accordingly, the observer can suitably view the display light.

In the foregoing transmissive display apparatus, for example, the control unit sets the second luminance to zero.

According to this configuration, the control unit sets the second luminance to zero. When the ratio change unit is in the second state, the front face reflected light and the rear face reflected light tend to be viewed as a double image since the foregoing ratio is high in comparison to the first state. However, with this configuration, since the second luminance is zero when the ratio change unit is in the second state, there is an advantage in that a double image will not be viewed.

In the foregoing transmissive display apparatus, for example, the transparent display panel includes an inner transparent plate, an outer transparent plate provided on an opposite side of the viewpoint relative to the inner transparent plate, and an intermediate film provided between the inner transparent plate and the outer transparent plate, the ratio change unit includes a switching diffractive element which is disposed on the intermediate film and is configured to be capable of changing a diffraction efficiency and the light transmittance, the control unit alternately switches the switching diffractive element, as the ratio change unit, between the first state and the second state at the predetermined duty ratio, the switching diffractive element diffracts an incident light at a predetermined diffraction efficiency in the first state, the diffraction efficiency of the switching diffractive element decreases and the light transmittance thereof increases in the second state in comparison to the first state, and the switching diffractive element causes the display light, in which the rear face reflected light advances toward the viewpoint in the second state, to advance in a direction other than a direction toward the viewpoint by diffracting the display light at the predetermined diffraction efficiency in the first state.

According to this configuration, the transparent display panel includes an inner transparent plate, an outer transparent plate provided on an opposite side of the viewpoint relative to the inner transparent plate, and an intermediate film provided between the inner transparent plate and the outer transparent plate. The ratio change unit includes a switching diffractive element which is disposed on the intermediate film and is configured to be capable of changing a diffraction efficiency and the light transmittance. The control unit alternately switches the switching diffractive element, as the ratio change unit, between the first state and the second state at the predetermined duty ratio. The switching diffractive element diffracts an incident light at a predetermined diffraction efficiency in the first state. The diffraction efficiency of the switching diffractive element decreases and the light transmittance thereof increases in the second state in comparison to the first state. The switching diffractive element causes the display light, in which the rear face reflected light advances toward the viewpoint in the second state, to advance in a direction other than a direction toward the viewpoint by diffracting the display light at the predetermined diffraction efficiency in the first state.

The light transmittance of the switching diffractive element increases in the second state in comparison to the first state. Thus, when the switching diffractive element is in the second state, the opposite side can be viewed easily from the viewpoint, and the display light can be transmitted easily through the switching diffractive element. Accordingly, when the switching diffractive element is in the second state, there is a display light in which the rear face reflected light transmitted through the switching diffractive element and reflected by the rear face of the transparent display panel advances toward the viewpoint. However, even with this kind of display light, the switching diffractive element, in the first state, diffracts such display light at a predetermined diffraction efficiency and causes it to advance in a direction other than a direction toward the viewpoint.

Accordingly, when the switching diffractive element is in the first state, it becomes difficult for the front face reflected light and the rear face reflected light to be viewed as a double image. Moreover, since the light transmittance of the switching diffractive element is high when the switching diffractive element is in the second state, the observer can suitably view the opposite side of the transparent display panel through the switching diffractive element. In addition, since the switching diffractive element is switched between the first state and the second state at a predetermined duty ratio by the control unit, it is possible to inhibit double images from being viewed by the observer, and enable the viewing of the opposite side from the viewpoint through the switching diffractive element.

In the foregoing transmissive display apparatus, for example, the ratio change unit includes a switching diffractive element which is disposed on a front face on the viewpoint side of the display area of the transparent display panel and is configured to be capable of changing the light transmittance and a light reflectance, the control unit alternately switches the switching diffractive element, as the ratio change unit, between the first state and the second state at the predetermined duty ratio, the light transmittance of the switching diffractive element in the second state becomes higher in comparison to the first state, the light reflectance of the switching diffractive element in the first state becomes higher in comparison to the second state, and the switching diffractive element reflects the display light, which transmits through the switching diffractive element and forms the rear face reflected light in the second state, such that the display light does not reach the viewpoint as the rear face reflected light in the first state.

According to this configuration, the ratio change unit includes a switching diffractive element which is disposed on a front face on the viewpoint side of the display area of the transparent display panel and is configured to be capable of changing the light transmittance and a light reflectance. The control unit alternately switches the switching diffractive element, as the ratio change unit, between the first state and the second state at the predetermined duty ratio. The light transmittance of the switching diffractive element in the second state becomes higher in comparison to the first state. The light reflectance of the switching diffractive element in the first state becomes higher in comparison to the second state. The switching diffractive element reflects the display light, which transmits through the switching diffractive element and forms the rear face reflected light in the second state, such that the display light does not reach the viewpoint as the rear face reflected light in the first state. Consequently, the light quantity of the rear face reflected light that reaches the viewpoint will decrease.

Accordingly, when the switching diffractive element is in the first state, it becomes difficult for the front face reflected light and the rear face reflected light to be viewed as a double image. Moreover, since the light transmittance of the switching diffractive element is high in comparison to the first state when the switching diffractive element is in the second state, the observer can suitably view the opposite side of the transparent display panel through the switching diffractive element. In addition, since the switching diffractive element is switched between the first state and the second state at a predetermined duty ratio by the control unit, it is possible to inhibit double images from being viewed by the observer, and enable the viewing of the opposite side from the viewpoint through the switching diffractive element.

In the foregoing transmissive display apparatus, for example, the ratio change unit includes a switching photochromatic mirror which is disposed on a front face on the viewpoint side of the display area of the transparent display panel and is configured to be capable of changing the light transmittance and a light reflectance, the control unit alternately switches the switching photochromatic mirror, as the ratio change unit, between the first state and the second state at the predetermined duty ratio, the light transmittance of the switching photochromatic mirror in the second state becomes higher in comparison to the first state, the light reflectance of the switching photochromatic mirror in the first state becomes higher in comparison to the second state, and the switching photochromatic mirror reflects the display light, which transmits through the switching photochromatic mirror and forms the rear face reflected light in the second state, such that the display light does not reach the viewpoint as the rear face reflected light in the first state.

According to this configuration, the ratio change unit includes a switching photochromatic mirror which is disposed on a front face on the viewpoint side of the display area of the transparent display panel and is configured to be capable of changing the light transmittance and a light reflectance. The control unit alternately switches the switching photochromatic mirror, as the ratio change unit, between the first state and the second state at the predetermined duty ratio. The light transmittance of the switching photochromatic mirror in the second state becomes higher in comparison to the first state. The light reflectance of the switching photochromatic mirror in the first state becomes higher in comparison to the second state. The switching photochromatic mirror reflects the display light, which transmits through the switching photochromatic mirror and forms the rear face reflected light in the second state, such that the display light does not reach the viewpoint as the rear face reflected light in the first state.

Accordingly, when the switching photochromatic mirror is in the first state, it becomes difficult for the front face reflected light and the rear face reflected light to be viewed as a double image. Moreover, since the light transmittance of the switching photochromatic mirror is high in comparison to the first state when the switching photochromatic mirror is in the second state, the observer can suitably view the opposite side of the transparent display panel through the switching photochromatic mirror. In addition, since the switching photochromatic mirror is switched between the first state and the second state at a predetermined duty ratio by the control unit, it is possible to inhibit double images from being viewed by the observer, and enable the viewing of the opposite side from the viewpoint through the switching photochromatic mirror.

In the foregoing transmissive display apparatus, for example, the transparent display panel includes an inner transparent plate, an outer transparent plate provided on an opposite side of the viewpoint relative to the inner transparent plate, and an intermediate film provided between the inner transparent plate and the outer transparent plate, the ratio change unit includes a switching light-shielding element which is disposed on the intermediate film and is configured to be capable of changing the light transmittance, the control unit alternately switches the switching light-shielding element, as the ratio change unit, between the first state and the second state at the predetermined duty ratio, the light transmittance of the switching light-shielding element in the first state becomes lower in comparison to the second state, and the switching light-shielding element transmits the display light, which transmits through the switching light-shielding element and forms the rear face reflected light in the second state, at a light transmittance that is lower in comparison to the second state so as to decrease a quantity of light that reaches the viewpoint as the rear face reflected light in the first state.

According to this configuration, the transparent display panel includes an inner transparent plate, an outer transparent plate provided on an opposite side of the viewpoint relative to the inner transparent plate, and an intermediate film provided between the inner transparent plate and the outer transparent plate. The ratio change unit includes a switching light-shielding element which is disposed on the intermediate film and configured to be capable of changing the light transmittance. The control unit alternately switches the switching light-shielding element, as the ratio change unit, between the first state and the second state at the predetermined duty ratio. The light transmittance of the switching light-shielding element in the first state becomes lower in comparison to the second state, and the switching light-shielding element transmits the display light, which is transmitted through the switching light-shielding element and forms the rear face reflected light in the second state, at a light transmittance that is lower in comparison to the second state so as to lower a quantity of light that reaches the viewpoint as the rear face reflected light in the first state.

Accordingly, when the switching light-shielding element is in the first state, it becomes difficult for the front face reflected light and the rear face reflected light to be viewed as a double image. Moreover, since the light transmittance of the switching light-shielding element is high in comparison to the first state when the switching light-shielding element is in the second state, the observer can suitably view the opposite side of the transparent display panel through the switching light-shielding element. In addition, since the switching light-shielding element is switched between the first state and the second state at a predetermined duty ratio by the control unit, it is possible to inhibit double images from being viewed by the observer, and enable the viewing of the opposite side from the viewpoint through the switching light-shielding element.

In one general aspect, a mobile object includes the foregoing transmissive display apparatus, an operating unit which is operated by the observer, a drive source which generates a drive force for traveling, and a drive control unit which controls the drive source according to operations of the operating unit by the observer.

According to this configuration, the operating unit is operated by the observer. The drive source generates a drive force for traveling. The drive control unit controls the drive source according to operations of the operating unit by the observer. As a result of comprising the foregoing transmissive display apparatus, it is possible to inhibit double images from being viewed by the observer, and enable the viewing of the opposite side from the observer's viewpoint. Accordingly, the observer can suitably operate the operating unit.

In one general aspect, a control apparatus which controls an image display unit, wherein the image display unit includes: a transparent display panel which transmits an extraneous light; a display unit which projects a display light representing an image toward a display area set at a part of the transparent display panel; and a ratio change unit which is provided to the display area of the transparent display panel, is configured to be capable of changing a light transmittance, and is configured to be capable of changing a ratio of a light quantity of a rear face reflected light that reaches a viewpoint of an observer relative to a light quantity of a front face reflected light that reaches the viewpoint, the rear face reflected light being the display light having transmitted through a front face of the transparent display panel and having been reflected off a rear face of the transparent display panel, and the front face reflected light being the display light having been reflected off a front face side of the display area of the transparent display panel; wherein the control apparatus comprises: a control unit which outputs a control signal to the ratio change unit to alternately switch the ratio change unit between a first state and a second state at a predetermined duty ratio, wherein the ratio change unit lowers, in the first state, the ratio by reducing the light quantity of the rear face reflected light that reaches the viewpoint in comparison to the second state, and wherein the light transmittance of the ratio change unit increases in the second state in comparison to the first state.

According to this configuration, the image display unit comprises a transparent display panel, a display unit, and a ratio change unit. The transparent display panel transmits an extraneous light. The display unit projects a display light representing an image toward a display area set at a part of the transparent display panel. The ratio change unit is provided to the display area of the transparent display panel. The ratio change unit is configured to be capable of changing a ratio of a light quantity of a rear face reflected light that reaches a viewpoint of an observer relative to a light quantity of a front face reflected light that reaches the viewpoint. The rear face reflected light is the display light having transmitted through a front face of the transparent display panel and having been reflected off a rear face of the transparent display panel. The front face reflected light is the display light having been reflected off a front face side of the display area of the transparent display panel. The ratio change unit is configured to be capable of changing a light transmittance. The control apparatus comprises a control unit. The control unit outputs a control signal to the ratio change unit to alternately switch the ratio change unit between a first state and a second state at a predetermined duty ratio. The ratio change unit lowers, in the first state, the foregoing ratio by reducing the light quantity of the rear face reflected light that reaches the viewpoint in comparison to the second state. The light transmittance of the ratio change unit increases in the second state in comparison to the first state.

Accordingly, since the foregoing ratio decreases in comparison to the second state when the ratio change unit is in the first state, it becomes difficult for the front face reflected light and the rear face reflected light to be viewed as a double image. Meanwhile, since the light transmittance increases in comparison to the first state when the ratio change unit is in the second state, the opposite side can be viewed easily from the viewpoint through the display area of the transparent display panel that is provided with the ratio change unit. Consequently, as a result of alternately switching the ratio change unit between the first state and the second state at a predetermined duty ratio, it is possible to inhibit the front face reflected light and the rear face reflected light from being viewed as a double image, and enable the viewing of the opposite side from the viewpoint through the display area of the transparent display panel that is provided with the ratio change unit. Consequently, the image display unit can be suitably controlled.

According to the present disclosure, the ratio change unit configured to be capable of changing the ratio of the light quantity of the rear face reflected light that reaches the viewpoint relative to the light quantity of the front face reflected light that reaches the observer's viewpoint, and configured to be capable of changing a light transmittance is provided to the display area, and the ratio change unit is alternately switched between the first state and the second state at a predetermined duty ratio. The ratio change unit, in the first state, lowers the foregoing ratio by reducing the light quantity of the rear face reflected light that reaches the viewpoint in comparison to the second state, and, in the second state, the light transmittance of the ratio change unit increases in comparison to the first state. Consequently, it is possible to view the external environment through the display area while preventing the generation of double images.

Industrial Applicability

The transmissive display apparatus, the mobile object and the control apparatus of the present disclosure can be applied to uses in transmissive display apparatuses and display systems which enable the viewing of the external environment through the display area while preventing the generation of double images.

What is claimed is:

1. A transmissive display apparatus, comprising:
a transparent display panel which transmits an extraneous light;
a display unit which projects a display light representing an image toward a display area set at a part of the transparent display panel;
a ratio change unit which is provided to the display area of the transparent display panel, is configured to be capable of changing a light transmittance, and is configured to be capable of changing a ratio of a light quantity of a rear face reflected light that reaches a viewpoint of an observer relative to a light quantity of a front face reflected light that reaches the viewpoint, the rear face reflected light being the display light having transmitted through a front face of the transparent display panel and having been reflected off a rear face of the transparent display panel, and the front face reflected light being the display light having been reflected off a front face side of the display area of the transparent display panel; and
a control unit which alternately switches the ratio change unit between a first state and a second state at a predetermined duty ratio, wherein
the ratio change unit lowers, in the first state, the ratio by reducing the light quantity of the rear face reflected light that reaches the viewpoint in comparison to the second state, and
the light transmittance of the ratio change unit increases in the second state in comparison to the first state.

2. The transmissive display apparatus according to claim 1, wherein
the control unit adjusts the duty ratio to cause an hourly-averaged visible light transmittance in the display area of the transparent display panel to be a predetermined defined value or higher.

3. The transmissive display apparatus according to claim 1, wherein
the control unit controls the display unit to set a luminance of the display light projected from the display unit as a first luminance when the ratio change unit is in the first state, and to set a luminance of the display light projected from the display unit as a second luminance that is lower than the first luminance when the ratio change unit is in the second state.

4. The transmissive display apparatus according to claim 3, wherein
the control unit sets the first luminance and the second luminance to values according to the duty ratio so that an hourly-average luminance of the display light becomes a predetermined level or higher.

5. The transmissive display apparatus according to claim 3, wherein the control unit sets the second luminance to zero.

6. The transmissive display apparatus according to claim 1, wherein
the transparent display panel includes an inner transparent plate, an outer transparent plate provided on an opposite side of the viewpoint relative to the inner transparent plate, and an intermediate film provided between the inner transparent plate and the outer transparent plate,
the ratio change unit includes a switching diffractive element which is disposed on the intermediate film and is configured to be capable of changing a diffraction efficiency and the light transmittance,
the control unit alternately switches the switching diffractive element, as the ratio change unit, between the first state and the second state at the predetermined duty ratio,
the switching diffractive element diffracts an incident light at a predetermined diffraction efficiency in the first state,
the diffraction efficiency of the switching diffractive element decreases and the light transmittance thereof increases in the second state in comparison to the first state, and
the switching diffractive element causes the display light, in which the rear face reflected light advances toward the viewpoint in the second state, to advance in a direction other than a direction toward the viewpoint by diffracting the display light at the predetermined diffraction efficiency in the first state.

7. The transmissive display apparatus according to claim 1, wherein
the ratio change unit includes a switching diffractive element which is disposed on a front face on the viewpoint side of the display area of the transparent display panel and is configured to be capable of changing the light transmittance and a light reflectance,
the control unit alternately switches the switching diffractive element, as the ratio change unit, between the first state and the second state at the predetermined duty ratio,
the light transmittance of the switching diffractive element in the second state becomes higher in comparison to the first state,
the light reflectance of the switching diffractive element in the first state becomes higher in comparison to the second state, and the switching diffractive element reflects the display light, which transmits through the switching diffractive element and forms the rear face reflected light in the second state, such that the display light does not reach the viewpoint as the rear face reflected light in the first state.

8. The transmissive display apparatus according to claim 1, wherein
the ratio change unit includes a switching photochromatic mirror which is disposed on a front face on the viewpoint side of the display area of the transparent display panel and is configured to be capable of changing the light transmittance and a light reflectance,
the control unit alternately switches the switching photochromatic mirror, as the ratio change unit, between the first state and the second state at the predetermined duty ratio,
the light transmittance of the switching photochromatic mirror in the second state becomes higher in comparison to the first state,
the light reflectance of the switching photochromatic mirror in the first state becomes higher in comparison to the second state, and
the switching photochromatic mirror reflects the display light, which transmits through the switching photochromatic mirror and forms the rear face reflected light in the second state, such that the display light does not reach the viewpoint as the rear face reflected light in the first state.

9. The transmissive display apparatus according to claim 1, wherein
the transparent display panel includes an inner transparent plate, an outer transparent plate provided on an opposite side of the viewpoint relative to the inner transparent plate, and an intermediate film provided between the inner transparent plate and the outer transparent plate,
the ratio change unit includes a switching light-shielding element which is disposed on the intermediate film and is configured to be capable of changing the light transmittance,
the control unit alternately switches the switching light-shielding element, as the ratio change unit, between the first state and the second state at the predetermined duty ratio,
the light transmittance of the switching light-shielding element in the first state becomes lower in comparison to the second state, and
the switching light-shielding element transmits the display light, which transmits through the switching light-shielding element and forms the rear face reflected light in the second state, at a light transmittance that is lower in comparison to the second state so as to decrease a quantity of light that reaches the viewpoint as the rear face reflected light in the first state.

10. A mobile object, comprising:
the transmissive display apparatus according to claim 1;
an operating unit which is operated by the observer;
a drive source which generates a drive force for traveling; and
a drive control unit which controls the drive source according to operations of the operating unit by the observer.

11. A control apparatus which controls an image display unit,
wherein the image display unit includes:
a transparent display panel which transmits an extraneous light;
a display unit which projects a display light representing an image toward a display area set at a part of the transparent display panel; and
a ratio change unit which is provided to the display area of the transparent display panel, is configured to be capable of changing a light transmittance, and is configured to be capable of changing a ratio of a light quantity of a rear face reflected light that reaches a viewpoint of an observer relative to a light quantity of a front face reflected light that reaches the viewpoint, the rear face reflected light being the display light having transmitted through a front face of the transparent display panel and having been reflected off a rear face of the transparent display panel, and the front face reflected light being the display light having been reflected off a front face side of the display area of the transparent display panel;
wherein the control apparatus comprises:
a control unit which outputs a control signal to the ratio change unit to alternately switch the ratio change unit between a first state and a second state at a predetermined duty ratio,
wherein the ratio change unit lowers, in the first state, the ratio by reducing the light quantity of the rear face reflected light that reaches the viewpoint in comparison to the second state,
and wherein the light transmittance of the ratio change unit increases in the second state in comparison to the first state.

\* \* \* \* \*